(12) United States Patent
Wittwer

(10) Patent No.: US 6,539,762 B1
(45) Date of Patent: Apr. 1, 2003

(54) DEVICE FOR RECEIVING AND HOLDING AN IDENTIFICATION PROVIDER, SUCH AS AN ELECTRONIC KEY, ESPECIALLY FOR AN IGNITION-STARTER SWITCH

(75) Inventor: Reinhard Wittwer, Heiligenhaus (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 09/914,312
(22) PCT Filed: Feb. 18, 2000
(86) PCT No.: PCT/EP00/01315
§ 371 (c)(1),
(2), (4) Date: Aug. 24, 2001
(87) PCT Pub. No.: WO00/51149
PCT Pub. Date: Aug. 31, 2000

(30) Foreign Application Priority Data

Feb. 25, 1999 (DE) ............................................. 199 08 085

(51) Int. Cl.⁷ ............................................... E05B 17/18
(52) U.S. Cl. .............................. 70/423; 70/252; 70/427; 70/455
(58) Field of Search ............................ 70/182–186, 252, 70/365, 366, 423, 424, 427, 428, 455, 389, 390, 429, 278.2, 278.3

(56) References Cited

U.S. PATENT DOCUMENTS

| | | | | |
|---|---|---|---|---|
| 108,099 A | * | 10/1870 | Brady | |
| 419,091 A | * | 1/1890 | Williams | |
| 834,918 A | * | 11/1906 | Lindgren | |
| 1,594,297 A | * | 7/1926 | Muzzio | |
| 1,657,402 A | * | 1/1928 | Kenworthy et al. | |
| 2,395,762 A | * | 2/1946 | Rober | |
| 2,906,112 A | * | 9/1959 | Vahlstrom | |
| 4,953,420 A | * | 9/1990 | Krubsack et al. | 70/366 |
| 5,189,895 A | * | 3/1993 | Schwab et al. | 70/366 |
| 5,335,520 A | * | 8/1994 | Lee | 70/349 |
| 5,467,624 A | * | 11/1995 | Myers | 70/455 |
| 5,479,800 A | * | 1/1996 | Myers | 70/365 |
| 6,067,382 A | * | 6/2000 | Naganuma | 70/186 |

FOREIGN PATENT DOCUMENTS

| | | | | |
|---|---|---|---|---|
| DE | 181773 | * | 12/1970 | ................. 70/252 |
| DE | 1962783 | * | 6/1971 | ................. 70/252 |
| DE | 3330740 | * | 3/1985 | ................. 70/252 |
| DE | 3503660 | * | 8/1986 | ................. 70/365 |
| DE | 197 51 805 C1 | | 10/1998 | |
| DE | 19836968 | * | 2/2000 | |
| FR | 2552147 | * | 3/1985 | ................. 70/247 |
| GB | 2075111 | * | 11/1981 | ................. 70/423 |

\* cited by examiner

*Primary Examiner*—Lloyd A. Gall
(74) *Attorney, Agent, or Firm*—Friedrich Kueffner

(57) ABSTRACT

The inventive device comprises a seat which is situated in the device housing and which is provided for the insertion of an identification provider. A holding element located inside the seat engages with a lateral indentation of the identification provider. The opening of the seat is normally closed by a spring-loaded cover element. In order to create a functionally reliable and economic design, the invention provides that the cover element is configured as a pivotal flap which can pivot from the identification provider out of an outwardly pivoted position covering the opening of the seat and into an inwardly pivoted position inside the seat. A projection is provided on the outer side of the flap and functions as a holding element for the identification provider. A recess is arranged next to the seat for the inward pivotal movement of the flap. During insertion and removal of the information provider, the projection of the flap runs along the contour of the information provider and temporarily pivots the flap further back into an overturned position. A profiled control surface is transferred into an effective blocking position which limits the space for the inwardly pivoted position of the flap thus ensuring the engagement of the projection of the flap inside the indentation of the identification provider.

11 Claims, 9 Drawing Sheets

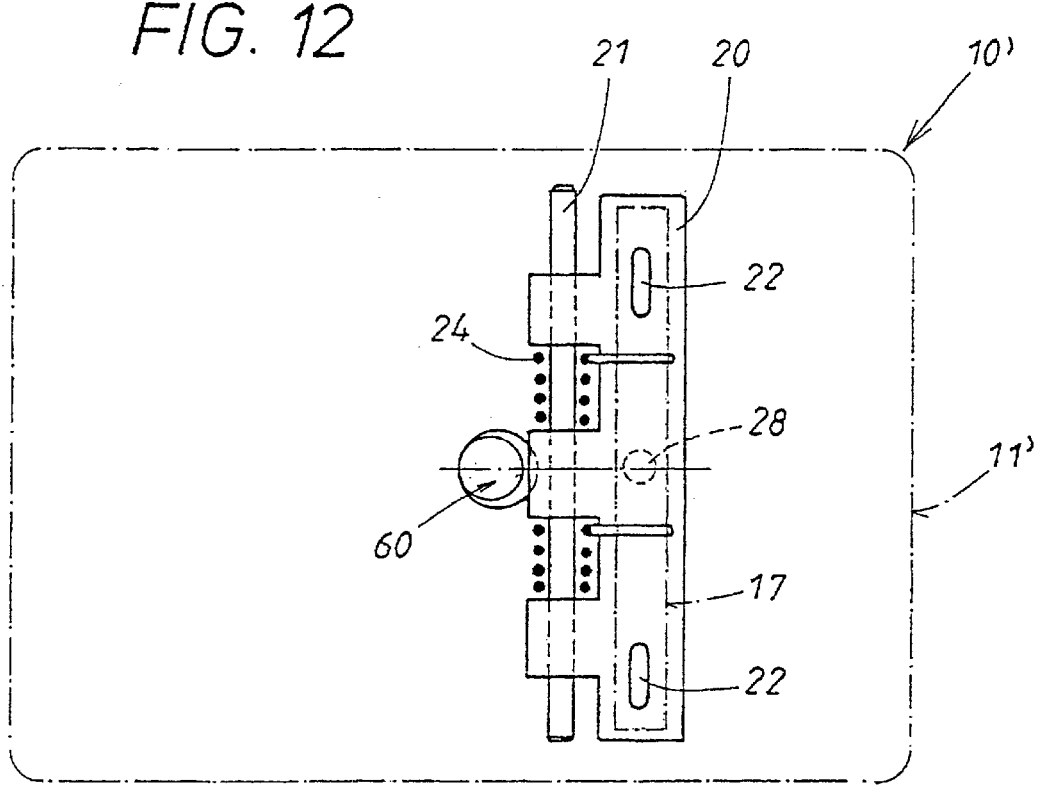

DEVICE FOR RECEIVING AND HOLDING AN IDENTIFICATION PROVIDER, SUCH AS AN ELECTRONIC KEY, ESPECIALLY FOR AN IGNITION-STARTER SWITCH

BACKGROUND OF THE INVENTION

1. Field of the Invention

In the case of mechanical keys with conventional wards and tumblers in the corresponding lock cylinder, the key can no longer be removed from the lock cylinder after it has been rotated when in the inserted position in the lock cylinder. The key can be inserted and removed only in the initial position of the lock cylinder. This effect is desired. This effect is not to be eliminated in the case of electronic keys which allow remote control.

2. Description of the Related Art

The invention is directed to a device for receiving and securing an identification provider such as an electronic key, in particular, for an ignition starter switch and/or a steering column lock of a motor vehicle, which cooperates with an electronic identification provider. The devices comprises a housing stationary within the vehicle which has at least one functional output such as a control shaft for the ignition starter switch or an electrical line to an ignition starter switch, and wherein the housing has a receptacle for insertion of the identification provider, wherein the identification provider has at least one lateral ward for a securing element provided within the receptacle, and wherein the opening belonging to the receptacle in the housing is closed by a spring-actuated cover element which upon insertion of the identification provider is pressed back against the spring force. This device can be arranged spatially separate from the steering column lock and/or an ignition starter switch but cooperates with these devices by means of mechanical or electrical connections. However, the device can also be combined with one or with both of these devices. In addition to these devices there may also be a separate actuator for starting the motor vehicle which actuator is an interactive connection with the device according to the invention, the ignition-starter switch and/or the steering column lock.

In a known ignition starter switch (DE 198 36 968 A1), which cooperates with an electronic key, an axially movable slide with an end plate is used as a cover element for the opening of the receptacle in the housing.

The slide is axially spring-loaded and is secured by end stops in a pushed-out position in which the opening is closed. The receptacle is positioned within a rotor within the housing. When the key is inserted, the rotor is transferred from a pre-determined rest position into different working positions in which the key can no longer be removed from the receptacle. This is achieved by locking pins guided in radial bores of the rotor which engage diametrically opposed cutouts in the inserted key in a rotational position deviating from the rest position of the rotor so that the key is secured in the inserted position within the rotor. Only in the rest position of the key the locking pins can be radially moved away from one another. In this ignition starter switch the securing elements for the key, on the one hand, and the cover element for the opening of the receptacle, on the other hand, are separate components which must be individually produced and mounted. This is cost-intensive. Operational disruptions of the separately acting elements add up.

SUMMARY OF THE INVENTION

The invention has the object to develop an operationally safe device of the aforementioned kind which can be produced in a cost-saving way. This is achieved according to the invention in that the cover element has a pivotably supported flap which is pivotable from an outer pivot position in which it closes the opening by means of the identification provider into an inner pivot position into the interior of the receptacle exposing the opening, that the flap at its exposed side has a projection which—in the inner pivot position—fits into the lateral ward of the identification provider and functions as a securing element for the identification provider, that the receptacle has a lateral recess, in that the flap during insertion and removal of the identification provider, by sliding of the projection onto the contour of the identification provider, can be pivoted farther back temporarily from its inner pivot position into an over-pivoted position, and that a control surface can be switched relative to the flap in its inner pivot position between a release position and a locking position, wherein the spatial area required for pivoting the flap farther into its over-pivoted position is free in the release position of the control surface but in the locking position is blocked and thereby secures the engagement of the projection of the flap in the ward of the identification provider.

The flap is loaded by a spring force. When the electronic key is removed, the flap is therefore secured in a closed position. Upon insertion and removal of the key, this spring force provides a snap-in effect which realizes a force-transmitting interaction between the inserted key and the projection of the flap. Upon switching of the control surface into its active locking position relative to the flap in its inner pivot position, a positive-locking interaction results. The projection on the flap engages then the lateral ward in the electronic key and secures thus its inserted position. Accordingly, the flap of the invention has a double function. It is firstly a cover element which, when the key is removed, closes the opening of the receptacle. The second function of the flap results because its projection at the same time is the securing element for the key. Therefore, it is only required to provide that the flap cannot be moved into the "over-pivoted position" mentioned above in those working positions of the lock which are to prevent its removal from the receptacle. This is ensured by the already mentioned control surface which blocks in its effective locking position a further pivoting of the flap into its over-pivoted position.

BRIEF DESCRIPTION OF THE DRAWINGS

Further measures and advantages of the invention result from the claims, the following description, and the drawings. In the drawings, the invention is illustrated with several embodiments. It is shown in:

FIG. 2b a position during the transition between FIGS. 1 and 2a;

FIG. 11 in a side view an identification provider embodied in the form of a credit card-like plate which can be used in such a device instead of the electric key illustrated in the embodiment of FIGS. 7 to 10b;

FIG. 12 an alternative to the device illustrated in FIGS. 8 to 10b in a plan view in analogy to FIG. 9 onto the most important components, before insertion of the different type of identification provider illustrated in FIG. 11.

DESCRIPTION OF PREFERRED EMBODIMENTS

Figure 1:
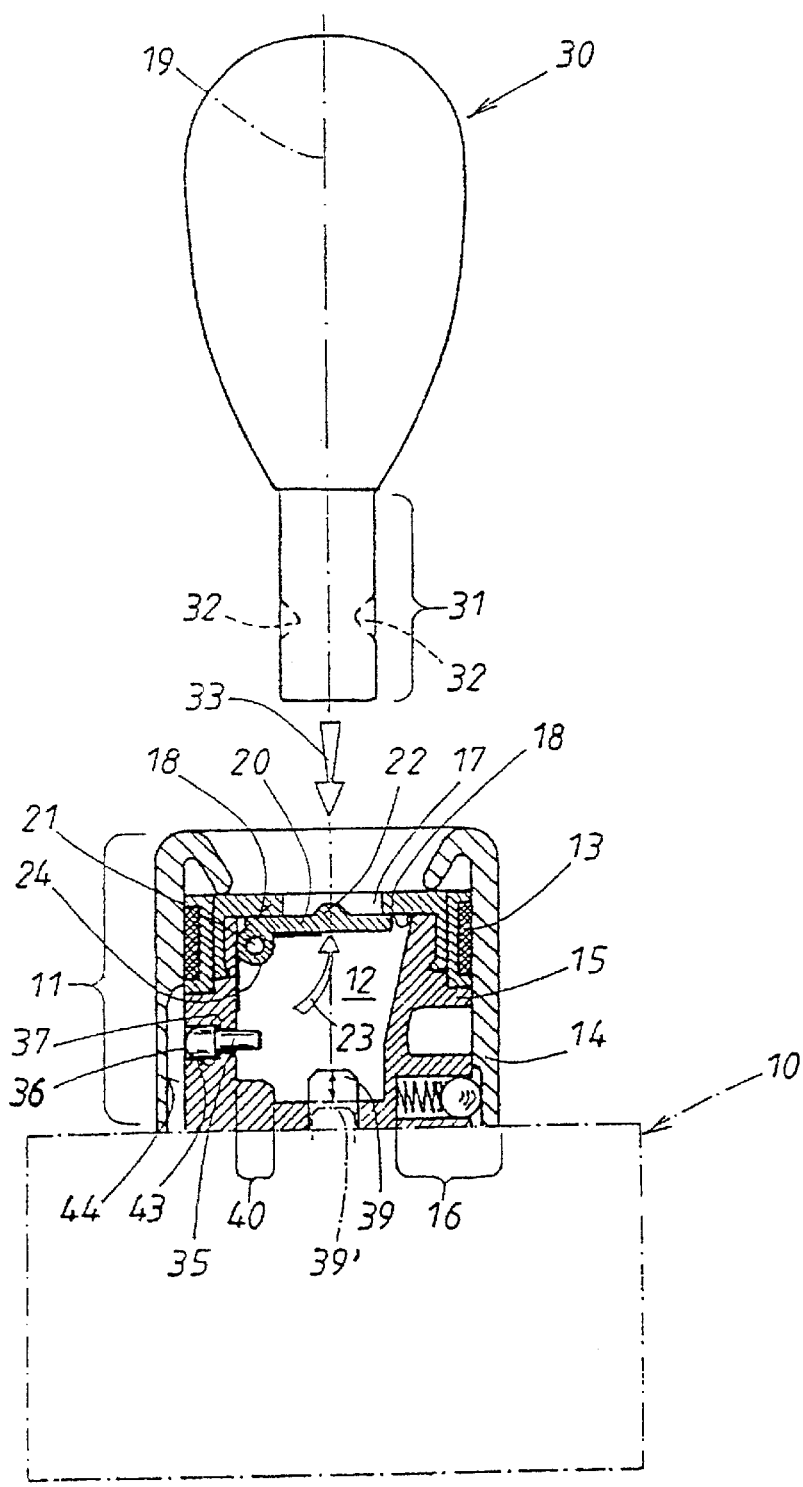
FIG. 1 the device according to the invention in longitudinal section and the corresponding identification provider embodied as a key before insertion into the receptacle.

In a first embodiment of FIGS. 1 to 3b, a device 10 is illustrated where the device housing 11 has a receptacle 12 for insertion of an identification provider 30. The identification provider is a so-called "electronic key" and cooperates in an electronic way with a steering column lock and/or an ignition starter switch. For this purpose, a transponder coil 13 arranged in the housing can be provided which electromagnetically determines the data electronically stored within the key 30.

Figure 2A:
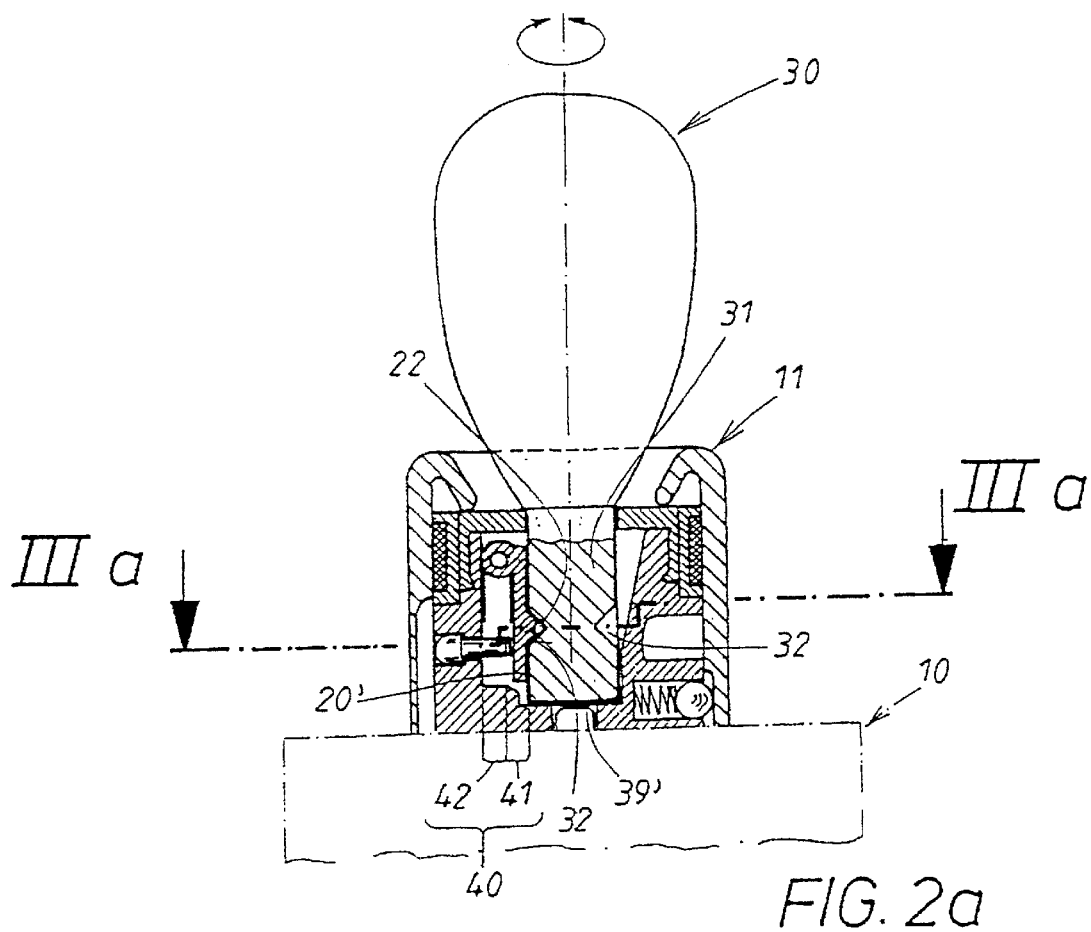
FIG. 2a in an illustration corresponding to FIG. 1 the insertion position of the key in the receptacle.
Figure 2B:
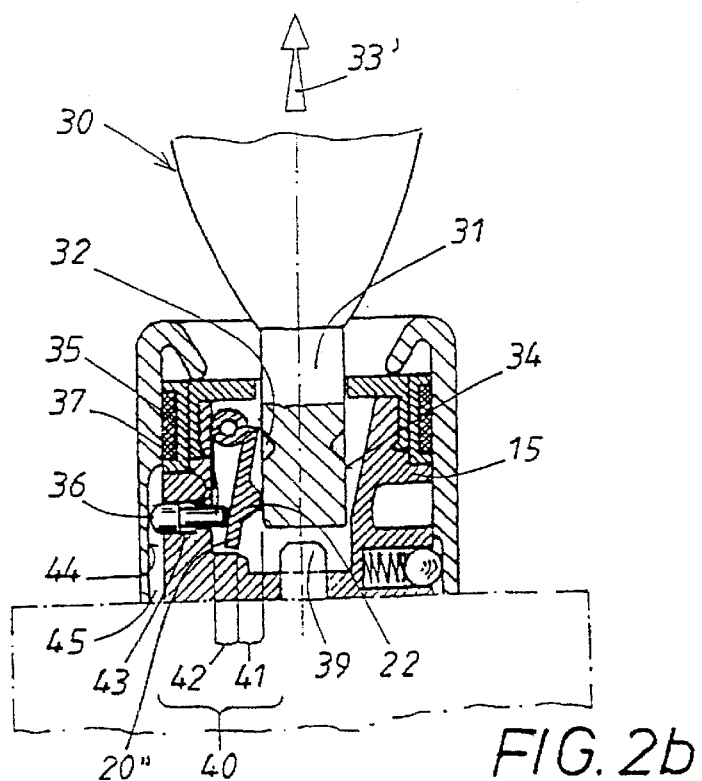
Figure 3A:
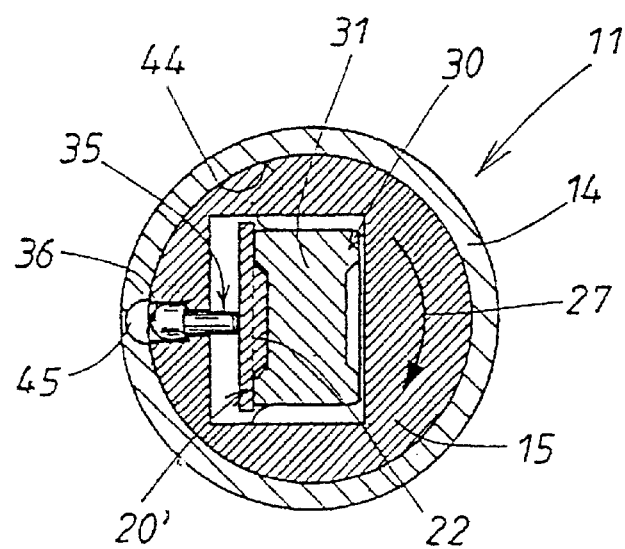
FIGS. 3a+3b cross-sections of the device with inserted key along the stepped section line IIIa—IIIa of FIG. 2a in two different rotational positions of the key.
Figure 3B:
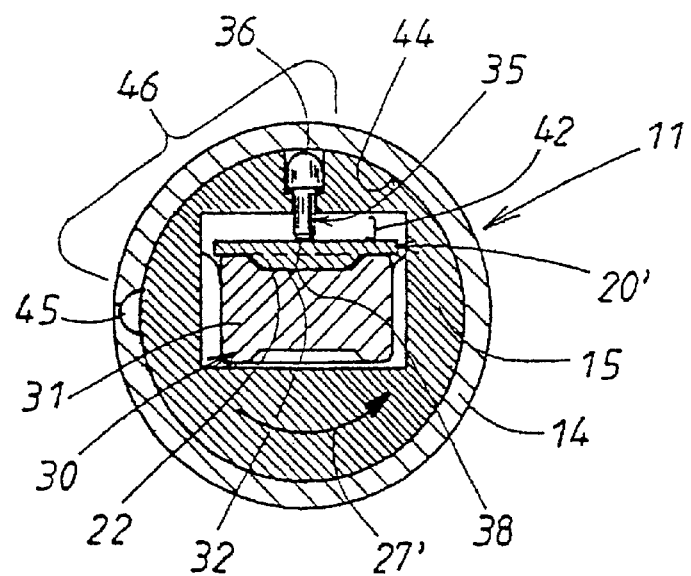

In the embodiment of FIGS. 1 through 3b the housing 11 comprises a rotor 15 and a stator 14. The stator is comprised of a cylindrical housing mantle. Between the stator 14 and the rotor 15, in addition to rotational stops, not illustrated in detail, locking elements 16 illustrated in FIG. 1 are provided which can secure the rotor 15 in certain rotational positions with a defined securing force. Two of these rotational positions are illustrated in FIGS. 3a and 3b. FIG. 3a shows the rest position of the rotor 15 where the insertion and removal of the bit 31 provided on the key 30 is possible. In the drawings according to FIGS. 2 to 3b the inner configuration of the bit 31 is not illustrated but instead only indicated by cross-hatching. The bit 31 of the key 30 has at least one lateral ward 32 which can also be formed as a hole or as a recess on the wide side of the key but in the following will always be referred to as a "ward". In the present case, the key 30 is to be used as a so-called "reversible key" so that the bit 31 has two identical, diametrically opposed wards 32, as illustrated in FIG. 1.

The receptacle 12 is positioned within the rotor 15. With the key 30 removed, according to FIG. 1, the opening 17 of the receptacle 12 is closed by the flap 20. This pivot position of FIG. 1 in the following will be referred to, for short, as the "outer pivot position". The receptacle 12 is provided with a lateral recess 40 for the flap 20. The space which is comprised of the actual receptacle 12 and the recess 40 is constricted to the inner width of the opening 17 provided in a cover. Accordingly, inner shoulders 18 for the flap 20 result which, on the one hand, function as an end stop for the flap 20 in the outer pivot position illustrated in FIG. 1 and, on the other hand, serve for providing a covered arrangement of the pivot axis 21 of the flap 20. The flap 20 is subjected to the effect of a spring force illustrated by the arrow 23 in FIG. 1. This spring force 23 is exerted by a spiral coiled spring 24 of a two-leg configuration arranged on the pivot axis 21. This spiral coiled spring 24 has the tendency to secure the flap 20 in its outer pivot position of FIG. 1.

Figure 4:
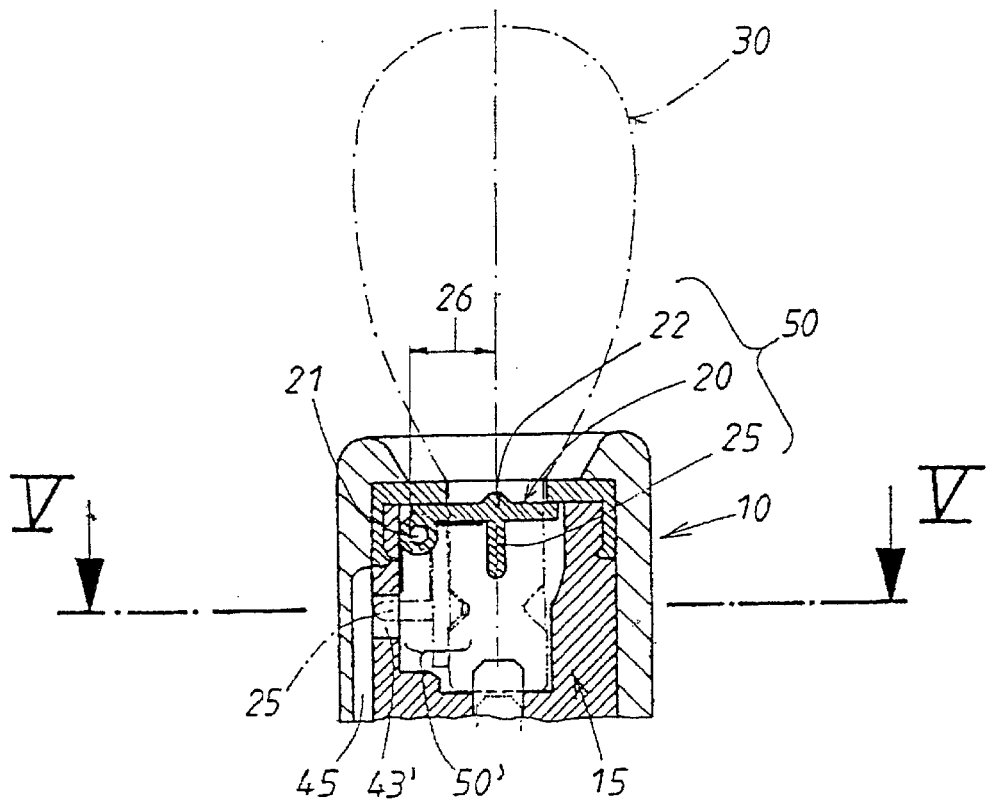
FIG. 4 in an illustration corresponding to FIG. 1 or FIG. 2 an alternative embodiment of the device.

The exposed side of the flap 20 is provided with a projection 22 which has a complementary profile matched to the aforementioned lateral ward 32 of the key 30. The projection 22, as is illustrated by means of the second embodiment illustrated in FIG. 4, is arranged at a radial spacing 26 relative to the pivot axis 21 and is positioned, according to FIG. 1, in the longitudinal center of the opening 17, approximately in alignment with the axis of the device indicated by a dash-dotted line in FIG. 1. The axis 19 is also the rotational axis of the described rotor 15.

Upon insertion of the key 30 in the direction of arrow 33 of FIG. 1, the flap 20 is pivoted against its spring load 23 into the interior of the receptacle 12 and will reach, when the key 30 is completely inserted according to FIG. 2a, the position 20' illustrated therein which position 20' is referred to in the following as the "inner pivot position". In this inner pivot position 20' the flap covers only the first area of the cutout 40 identified with 41. In this connection, the flap projection 22 engages one of the two wards 32 of the key 30. During insertion 33, as can be seen in FIG. 2b, the flap must be pivoted back into the position identified with 20" so that the projection 22 can glide across a peripheral contour 34 of the key bit 31 having a greater width. As can be seen in FIG. 2b, for this purpose the flap 30 must be pivoted back past the first spatial area 41 of the recess 40 into the adjoining secondary area 42. This farther-back pivot position 20" of the flap of FIG. 2b will be referred to in the following as the "over-pivoted position".

As can be also seen in FIG. 2b, the recess 40 in the rotor 15 extends in a radial bore 43 of the rotor up to a profiled inner surface 44 of the aforementioned housing mantle 14. In this bore 43 a control member 35 is arranged which in this embodiment is comprised of a loose control pin 35 which is facing with its radial outer end 36 the inner surface 44. This outer end 36 is rounded. The bore 43 is stepped and, like the control pin, is provided with a thicker head so that the cooperating end stops result which are illustrated in FIG. 2b at 37. By means of the end stops 37 the control pin 35 is secured in a defined axial position illustrated in FIG. 2a where its radial inner end 38 projects into the aforementioned second area of the recess 40. Expediently, the inner end 38 of the control pin is located at the boundary to the first spatial area 41 of the recess 40. As illustrated in FIG. 2a, the spatial area 41 required for the inner pivot position 20' of the flap is limited. The respective axial position of the control pin 35 is determined by the special profile of the already mentioned inner surface 44 of the housing mantle 14 which thus constitutes a "control surface" for this pin 35.

As already mentioned, the rotor 15 can be rotated by the inserted key 30 from its rest position illustrated in FIG. 3a into at least one further working position according to FIG. 3b in the direction of arrow 27. When doing so, the flap positioned in its inner pivot position 20' and the control pin 35 are entrained. The aforementioned profile of the control surface 44 of the housing mantle 14 is comprised of a radial depression 45 which is aligned in the rest position of FIG. 3a with the outer end 36 of the control pin 35. The adjoining areas of the control surface 44 are formed by the unchanged hollow cylinder surface 46 of the housing mantle 14 and act therefore as a "radial projection". In the working position of FIG. 3b the control pin 35 has reached with its outer end 36 a position in front of this radial projection 46 and is therefore locked in the described position penetrating the spatial area 42. The radial inner end 38 of the control pin 35 is supported on the flap which is in its inner pivot position 20' and prevents its further pivot movement to the over-pivoted position 20" of FIG. 2b. Accordingly, the engagement of the projection 22 of the inwardly pivoted flap 20' in the ward 32 of the key bit 31 is ensured. The hollow cylinder area 46 of the control surface 44 generates thus an effective "locking position" for the control pin 35 which blocks the flap in its inner pivot position 20'.

However, the key 30 can be removed from the device 10 only when it is rotated back in the direction of the counter arrow 27' to such an extent that the rotor 15 is in its rest position of FIG. 3a. Now the radial outer end 36 of the control pin 35 is aligned with the radial depression of the control surface 44 embodied as an inner groove 45. Upon removal of the key 30 in the direction of arrow 33' of FIG. 2b the projection 22 is radially pushed away by the slanted surfaces of the ward 32. The flap then reaches its over-pivoted position 20". The control pin 35 is moved with its outer end 36 into the inner groove 45. Then the projection 22 of the flap 20" which has been pivoted farther can glide along the peripheral contour 34 of the key bit 31. In the rest position of the rotor 15 the control pin is thus in its "release position". This release position allows a radial movement of the control pin 35 according to FIG. 1 and FIG. 2b.

Expediently, the device 10 is moreover provided with a sensor 39, which monitors the complete insertion position of the key bit 31 in the receptacle 12. It can be comprised of, for example, an axially slidable slide member 39 which penetrates through a bottom opening into the receptacle 12 and can be pushed back in the direction of the double arrow indicated in FIG. 1 by the end face of the key bit 31 from the "key out" position illustrated in solid lines into the "key in" position indicated in dashed lines. This is realized in FIG. 2a.

Figure 5:
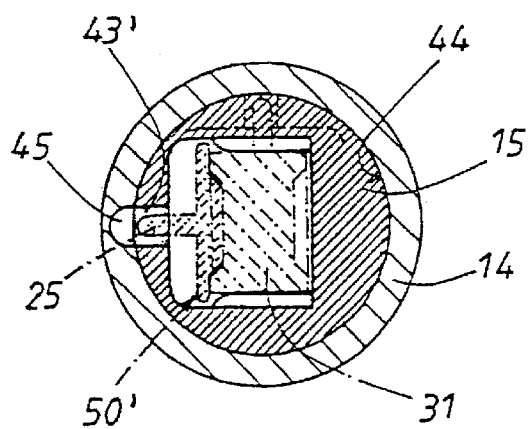
FIG. 5 a cross-section of the key in FIG. 4 along the section line V—V.

The second embodiment of the device 10 according to FIGS. 4 and 5 has substantially the same configuration as the lock of the first embodiment illustrated in FIGS. 1 through 3b. Therefore, the same description applies. Only the differences need to be discussed.

The difference of the device 10 of the second embodiment of FIGS. 4 and 5 resides primarily in that instead of the separate free control pin 35 the flap 20 therein is provided with a control pin 25 formed on its backside. In this case a foldable module 50 comprised of the flap 20, the projection 22, and the control pin 25 is present. In FIGS. 4 and 5 the inner pivot position 50' of the module is illustrated in dash-dotted lines. In this case, the radial outer end of the control pin 25 projects into a radial penetration 43' of the rotor 15 and then is aligned with the inner groove 45 of the control surface 44, also present here, in the interior of the housing mantle 14, when the rest position of the rotor 15 illustrated in FIGS. 4 and 5 is present.

Figure 6:
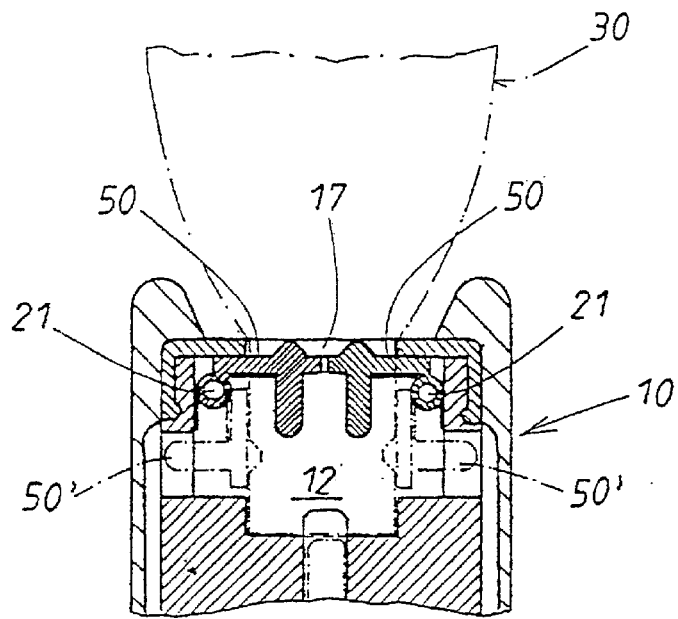
FIG. 6 in an illustration analog to FIG. 4 a third embodiment of the device according to the invention.

FIG. 6 shows a modification of the device according to FIGS. 4 and 5. The difference in FIG. 6 resides in that two of the aforementioned modules 50 are provided which in their outer pivot position illustrated in solid lines cover one half of the opening 17 of the receptacle 12, respectively. The two modules 50 have pivot axes 21 which are separate from one another, and they are pivoted by insertion of the electronic key 30 in a mirror-symmetrical way relative to one another. They reach the two pivot positions 50' illustrated in dash-dotted lines in FIG. 6.

In FIGS. 8 to 10b a device 10' formed as a "key holder" is illustrated which is also provided with a flap 20 in the area of the housing receptacle 12 but this receptacle 12 is stationary and is not a component of a rotor. The key holder 10' can cooperate in the way illustrated in FIG. 7 with further devices 51, 53. Even though mechanical connections could be present, in the present case electrical connections 47 between these devices 10', 51, 53 are used. For this purpose, contact terminals 48 are provided in the correlated housing 11' according to FIG. 8.

Figure 7:
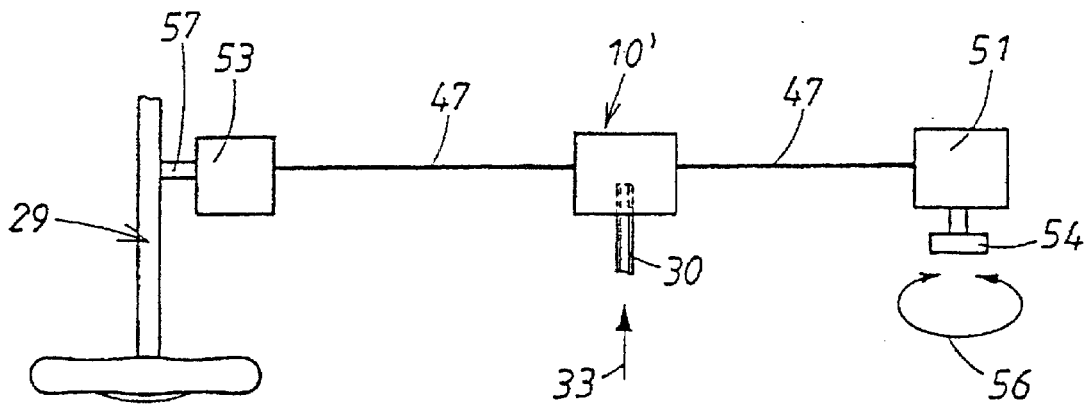
FIG. 7 in a schematic illustration the use of a fourth embodiment of the device according to the invention as a key holder in connection with an electrical ignition starter switch and an electrical steering column lock for a motor vehicle.
Figure 8:
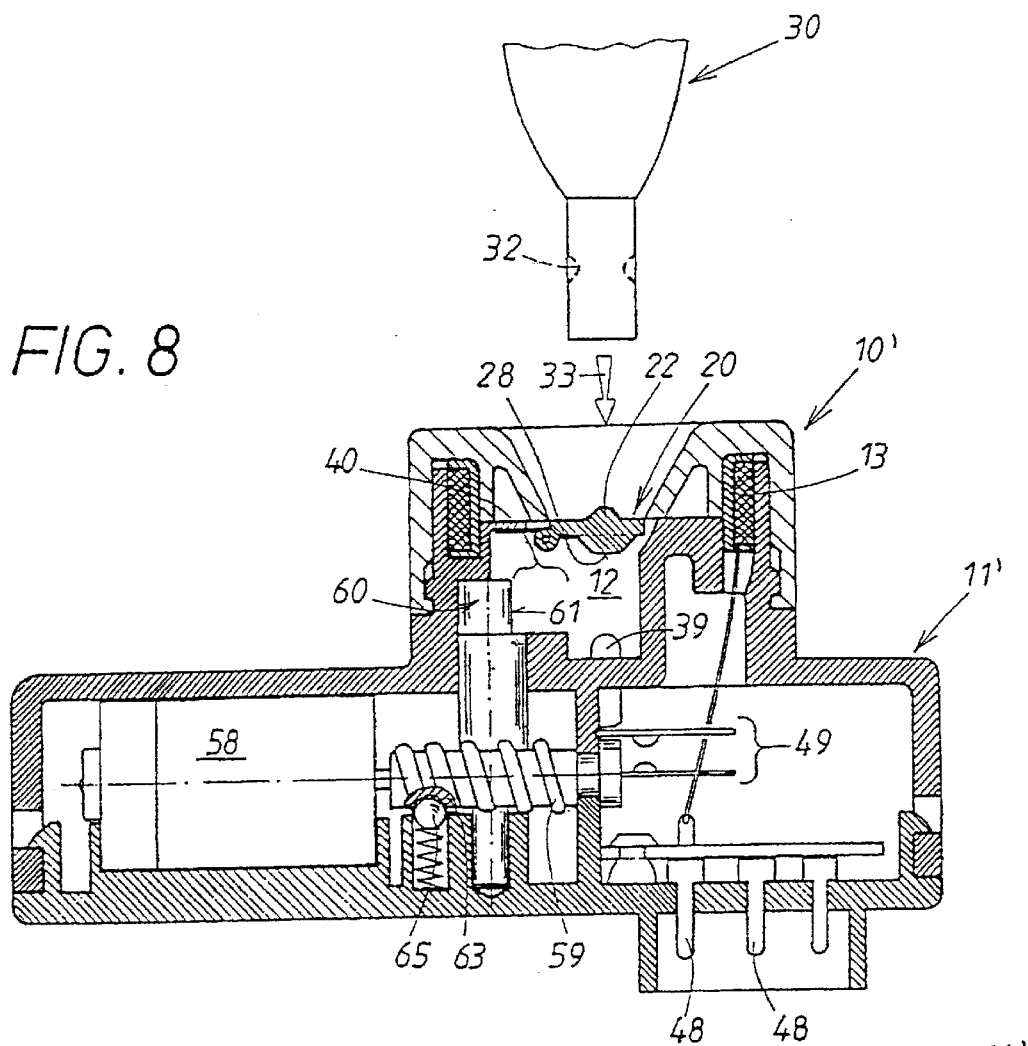
FIG. 8 a longitudinal section of the device according to FIG. 7 before insertion of the key.
Figure 9:
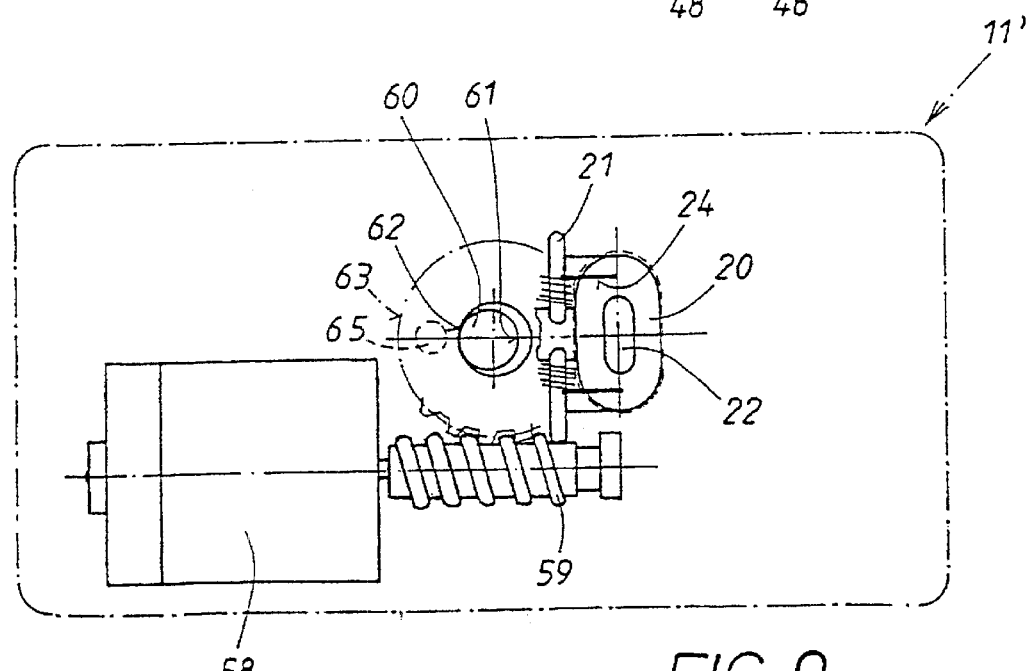
FIG. 9 in a plan view the arrangement of some components in the interior of the device illustrated in FIG. 8.

The first device 51 of FIG. 7 is comprised of an electric ignition starter switch which has an actuator 54. The actuator 54 serves for starting a motor, not illustrated in detail, of a motor vehicle. For this purpose, the actuator can be, for example, configured as a turn knob which can be actuated in the direction of the actuating arrow 56 indicated in FIG. 7. The correct insertion position of the key 30 is monitored by a key-in contact 49 whose one contact leg is controlled, for example, by the axially movable slide member 39 described already in the previous embodiment. Before insertion of the key 30, the contact 49 according to FIG. 8 is open. The completely inserted key according to FIG. 10a and 10b presses the slide member into the position 39' which closes the contact 49. Now an identification between the key 30 and the key holder 10 can be realized electronically or magnetically, which, for example, can be made possible by the transponder coil 13 which is illustrated in FIG. 8.

Upon insertion of the key 30, in this case the flap is also pivoted back from the outer pivot position 20 illustrated in FIG. 8 into the inner pivot position 20' so that again engagement of the projection 22 of the flap with the ward 32 of the key is provided. For engagement and disengagement of the key 30, the flap 20 is also briefly brought into the over-pivoted position according to FIG. 2b described in connection with the first embodiment. Accordingly, the above description applies.

The key holder 10' is connected by a mechanical and/or electrical connection 47 with an electrical steering column lock 53. This lock 53 locks by means of a locking member 57 the steering column 29 according to FIG. 7 when the key 30 has not been inserted in the direction of arrow 33 into the lock 10'. The ignition starter switch 51 and the steering column lock 53 can be combined with one another in a constructive unit.

A further difference of the key holder 10' of FIG. 8 to FIG. 10b relative to the previous variants 10 of the lock according to FIGS. 1 to 6 resides in that the control surface is comprised of the control curve 61, 62 of a rotationally driven eccentric 60. As can be seen especially well in FIG. 9, an electric motor 58 arranged in the housing 11' is provided for driving the eccentric 60 which, by means of the worm 59, drives the worm gear 63 fixedly connected with the eccentric 60. The control curve on the eccentric 60 comprises a radially recessed curve portion 61 and a radially projecting curve portion 62 which is positioned diametrically opposite the recessed portion 61. Usually, the eccentric 60 is in the rotational position illustrated in FIG. 8 to FIG. 10a where the recessed curve portion 61 points toward the hollow 40 adjacent to the receptacle 12. Then the eccentric 60 is in its release position relative to the inner pivot position 20' of the flap illustrated in FIG. 10a. Then, as already described in connection with the device 10, an insertion 33 and a removal 33' of the key 30 from the lock 10 is possible easily.

Figure 10A:
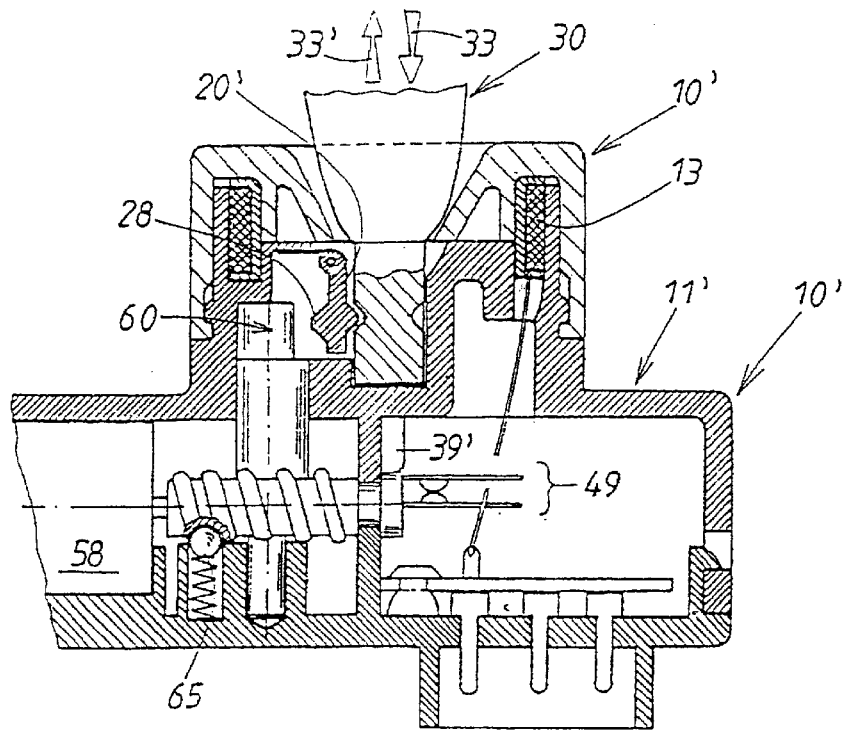
FIGS. 10a+10b in an illustration corresponding to FIG. 8 a portion of the device with inserted identification provider embodied as a key in two different positions of the locking-effecting component in the interior of the device.
Figure 10B:
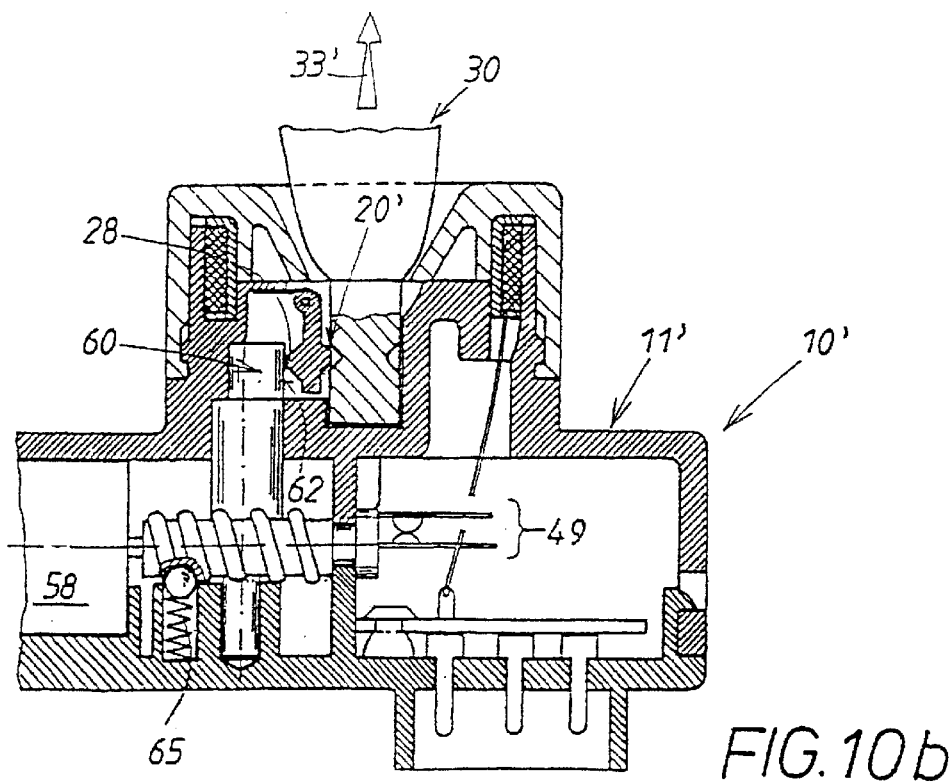

Without the key the starter actuator 51 of FIG. 7 is ineffective; the motor of the vehicle cannot operate. When the proper key is inserted into the key holder 10', an actuation of the actuator 54 of the ignition starter switch 51 is successful. This is controlled by an electronic evaluation device for the key code. In this connection, not only the aforementioned further devices 51, 53 are controlled in the required way, but also the step motor 58 is driven by a defined stroke. Accordingly, the eccentric 60 is rotated to such an extent that its radially projecting curve portion 62 moves into a position in front of the control cam 28 of the flap which is in its inner pivot position 20'. Then the electric motor 58 stops automatically. In this rotational position of the eccentric 60 the inwardly pivoted flap 20' is clamped fast on the key 30 by the control cam 28 which is supported on the eccentric. Now an effective locking position of the eccentric 60 according to FIG. 10b is provided. As long as the motor vehicle is in operation, a removal of the key in the direction of arrow 33' is blocked. A key removal is possible only when the motor vehicle motor has been switched off. Subsequently, a locking of the steering column 29 by the device 53 takes place. In order to secure the eccentric 60 in the blocking position of FIG. 10b or in the release position of FIG. 10a, a locking element 65, for example, in the form of a ball lock can be provided that cooperates with corresponding lock depressions at the lower end face of the worm gear 63.

In FIGS. 11 and 12 a modification of the key holder 10' is illustrated. For identifying the components the same previously used reference numerals are employed so that in this respect the previous description applies. It is sufficient to point out only the differences.

One difference resides in that, instead of the afore described remote control key 30, a plate-shaped identification provider 30' is used which has, for example, the format of a so-called credit card. As a result of this shape, several wards 32' are expediently provided within the identification provider 30'. Because it is desired that this credit card 30' be also used in a reverse position in the key holder 10', on both lateral surfaces of the credit card 30' two wards 32 are provided, respectively. The housing 11' indicated in FIG. 12 has an opening 17 matched to the plate-shape of the credit card 30' which opening is closed by the outer pivot position of the flap 20. The flap 20 has at its exposed side two projections 22 correlated with the wards 32' while at the backside a control cam 28 is arranged approximately at the plate center. As a function of the actuation of the starter button or the like, in this case the eccentric 60 is switched between the two already described active and inactive positions when the credit card 30' is inserted into the key holder 10, in analogy to FIGS. 10a and 10b.

Figure 13:
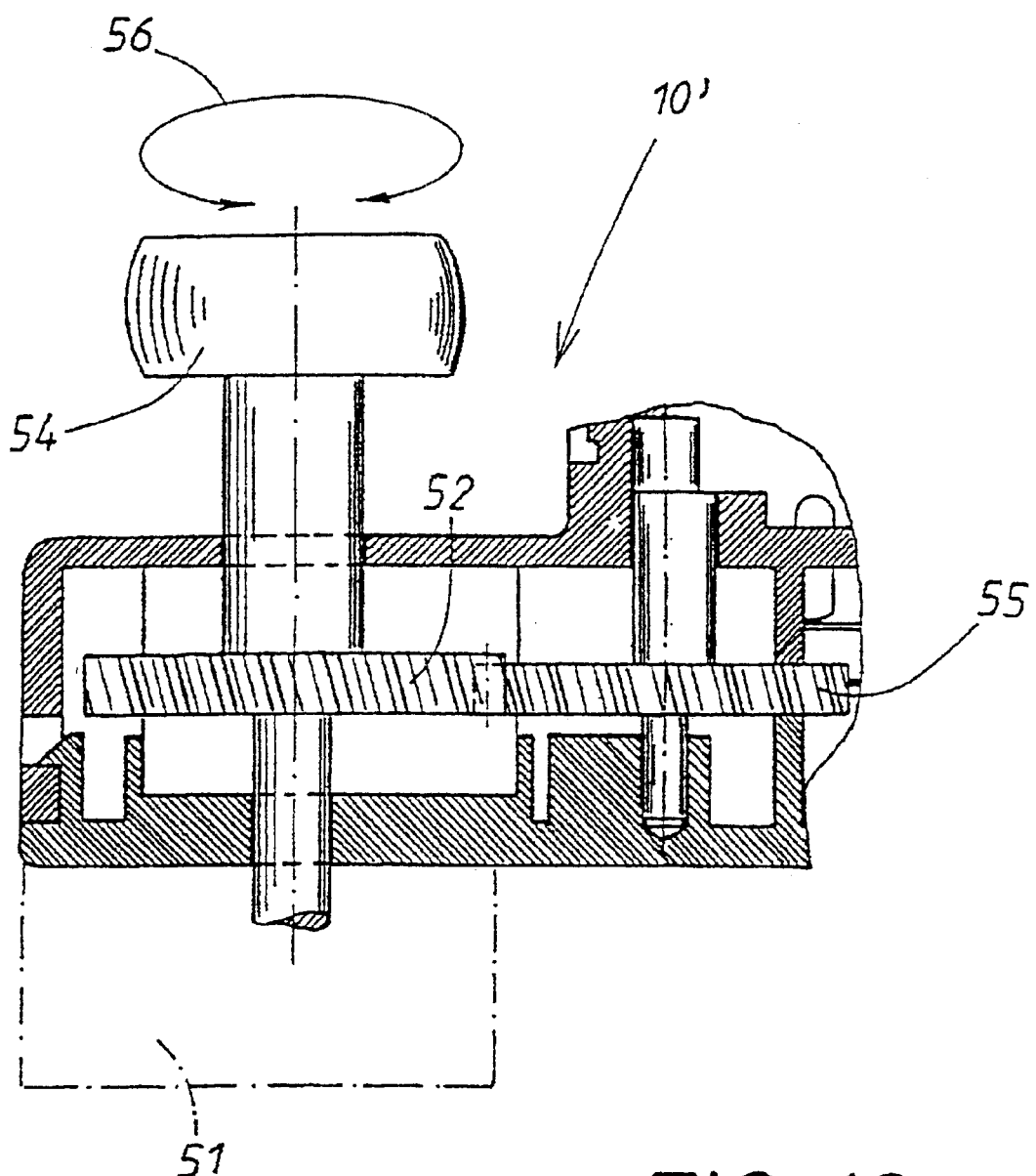
FIG. 13 schematically in longitudinal section analog to FIG. 8 a portion of a further alternative device according to the invention.

FIG. 13 shows a portion of the key holder 10' in a modification relative to FIG. 8. Only the changed means for switching the eccentric 60 are illustrated. The rotary actuator 52, already mentioned in connection with FIG. 7, which acts here also onto an ignition starter switch 51, is connected by a gear system 52, 55 with the eccentric 60. The rotary actuator 54 is fixedly connected to the gear 52 which meshes with the gear 55. This gear 55 is, in turn, fixedly connected to the eccentric 60. A rotary actuation in the direction of arrow 56 then results in the described switching of the eccentric 60 with the curve sections 61, 62 that can be seen in FIG. 9.

List of Reference Numerals 10 device
10' key holder, device
11 housing of 10
11' housing of 10'
12 receptacle in 15 or 11'
13 transponder coil
14 stator, cylindrical housing mantle
15 rotor
16 locking element between 14, 15
17 opening of 12
18 inner shoulder of 15
19 axis of device, rotational axis of 15
20 flap (in outer pivot position)
20' inner pivot position of 20
20" over-pivoted position of 20
21 pivot axis of 20
22 projection on 20
23 spring load, force arrow
24 spiral coiled spring for 23
25 control pin formed on 20 (FIGS. 4, 5)
26 radial spacing between 22, 21 (FIG. 4)
27 rotary arrow of 15
27' counter rotary arrow of 15
28 control cam on 20 (FIG. 8)
29 steering column (FIG. 7)
30 identification provider, electrical key
30' identification provider, credit card
31 key bit of 30
32 lateral ward in 30
32' ward of 30 (FIG. 11)
33 insertion arrow for 30
33' removal arrow of 30
34 peripheral contour of 31
35 control member, loose control pin (FIG. 1)
36 radial outer end of 35
37 axial end stop for 35
38 radial inner end of 35
39 sensor for 30, axially movable slide member ("key out" position)
39' "key in" position of 39
40 recess in 12
41 first spatial area of 40 for 20'
42 second spatial area of 40 for 20"
43 bore in 15
43' radial penetration in 15 (FIGS. 4, 5)
44 control surface for 35 or 25, inner surface of 15
45 radial depression in 44, inner groove
46 radial projection of 44, hollow cylinder surface
47 electrical connections at 50' (FIG. 7)
48 contact terminal in 50'
49 key-in contact
50 module comprised of 22, 25, 35 (in the outer pivot position)
50-40 inner pivot position of 50
51 first device, ignition starter switch (FIG. 7)
52 gear system, gear of 54
53 third device, electrical steering column lock (FIG. 7)
54 actuator of 51, turn knob
55 gear system, gear 55
56 rotary actuation arrow of 54
57 locking member on 53
58 electric motor in 11'
59 worm on 58
60 eccentric
61 control curve on 60, radially recessed curve portion
62 control curve of 60, radially projecting curve portion
63 worm gear
65 ball lock for 63

What is claimed is:

1. Device (10, 10') for receiving and securing an identification provider (30, 30') of a motor vehicle, comprising a housing (11, 11') stationary within the vehicle which has at least one functional output and wherein the housing has a receptacle (12) for insertion of the identification provider (30, 30'), wherein the identification provider (30, 30') has at least one lateral ward (32, 32') for a securing element provided within the receptacle (12), and wherein an opening (17) belonging to the receptacle (12) in the housing (11, 11') is closed by a spring-actuated cover element which upon insertion (33) of the identification provider (30, 30') is pressed back against a spring force (23), wherein the cover element has a pivotably supported flap (20) which is pivotable from an outer pivot position (20) in which it closes the opening (17) by means of the identification provider (30, 30') into an inner pivot position (20') into the interior of the receptacle (12) exposing the opening, wherein the flap (20) at its exposed side has a projection (22) which—in the inner pivot position (20')—fits into the lateral ward (32) of the identification provider (30, 30') and functions as a securing element for the identification provider (30, 30'), wherein the receptacle (12) has a lateral recess (40), wherein the flap (20) during insertion and removal (33, 33') of the identification provider (30, 30'), by sliding of the projection (22) onto the contour (34) of the identification provider (30, 30'), can be pivoted farther back temporarily from its inner pivot position (20') into an over-pivoted position (20"), and wherein a control surface (44, 60) can be switched relative to the flap in its inner pivot position (20') between a release position (45, 61) and a locking position (46, 62), wherein the spatial area (42) required for pivoting the flap (20) farther into its over-pivoted position (20") is free in the release position (45, 65) of the control surface (44, 60) but in the locking position (46, 62) is blocked and thereby secures the engagement of the projection (22) of the flap in the ward (32, 32') of the identification provider (30, 30').

2. Device according to claim 1, wherein the housing (11) comprises a rotor (15) which is provided with the receptacle (12) as well as the flap (20), wherein the rotor (15) is rotatable in a stationary housing mantle (14) from the rest position into at least one further working position by the identification provider (30), wherein the control surface (44) is provided on the inner surface of the housing mantle (14) and cooperates with a control member (35, 25) and—relative to the control member (35, 25)—has in the area of the rest position a radial depression (45) and in the area of the working position a radial projection (46), and wherein the control member (35, 25) penetrates through a bore (43, 43') in the rotor (15), engages the flap (20) positioned in the receptacle (12) and the flap (20)—as a function of the rotational position of the identification provider (30)—either locks the flap in its inner pivot position (20') or releases its further pivoting into the over-pivoted position (20").

3. Device according to claim 2, wherein the control member (35, 25) is guided freely between axial end stops (37) in the bore (43) of the rotor (15)

and wherein the control member (35, 25)—when aligned with its radial outer end (36) relative to the radial projection (46) in the housing mantle (14)—with its free radial inner end (38) projects into that spatial area (42) of the recess (40) which is required for the over-pivoted position (20") of the flap (20).

4. Device according to claim 2, wherein the control member (25) is seated on the backside of the flap (20) and the control member (25) together with the projection (22) and the flap (20) form a common pivotable module (50), and wherein—in the inner pivot position (50') of the module—the radial outer end (36) of the control member (25) is pivoted into a radial penetration (43') of the rotor (15) and cooperates with the radial depression (45) or the radial projection (46) on the housing mantle (14).

5. Device according to claim 1, wherein the receptacle (12) in the housing (11') is stationary but the control surface is comprised of the control curve (61, 62) of a rotationally driven eccentric (60), wherein the drive (58) of the eccentric (60) can be controlled by means of a further actuator (54) and can transfer the eccentric (60) into at least two defined rotational positions, wherein the eccentric is arranged adjacent to the cutout (40) in the housing (11') provided for the flap (20) and has a radially projecting (62) as well as a radially recessed curve portion (61), and wherein—as a function of the actuation of the actuator (54)—these curve portions (61, 62) directly or indirectly, by means of a control member, either block the flap in its inner pivot position (20') and secure the identification provider (30, 30') in the receptacle (12) or release the flap and thus the identification provider (30, 30').

6. Device according to claim 1, wherein the receptacle (12) is closed by a cover and the cover has said opening (17), matching the cross-section of the identification provider (30, 30'), for insertion and removal of the identification provider (30, 30'), and wherein the cover has inner shoulders (18) which function as at least one of end stops for the outer pivot position (20) of the flap and a covering arrangement of the pivot bearing (21) of the flap (20).

7. Device according to claim 1, wherein the projection (22) serving as a securing element for the identification provider (30, 30') is arranged at a radial spacing (26) to the pivot axis (21) of the flap (20).

8. Device according to claim 7, wherein the projection (22)—when viewed in the outer pivot position (20) of the flap—is located approximately in the longitudinal center (19) of the opening (17) of the housing (11).

9. Device according to claim 1, wherein the flap (20) has several projections (22) having correlated therewith several wards (32') in the identification provider (30').

10. Device according to claim 1, wherein the identification provider (30') has a credit card shape.

11. Device according to claim 1, wherein the receptacle (12) in the housing (11) has several flaps (20) which are seated on separate pivot axes (21) but are pivotable together by the same identification provider (30)

and wherein at least one of the flaps (20) has a projection (22) and optionally a control member (25).

* * * * *